United States Patent [19]
Shaffer et al.

[11] Patent Number: 5,911,123
[45] Date of Patent: Jun. 8, 1999

[54] SYSTEM AND METHOD FOR PROVIDING WIRELESS CONNECTIONS FOR SINGLE-PREMISES DIGITAL TELEPHONES

[75] Inventors: Shmuel Shaffer, Palo Alto; William J. Beyda, Cupertino; Mieu-Hong Dang, San Jose, all of Calif.

[73] Assignee: Siemens Information and Communications Networks, Inc., Boca Raton, Fla.

[21] Appl. No.: 08/690,662

[22] Filed: Jul. 31, 1996

[51] Int. Cl.[6] .................................................. H04M 11/00
[52] U.S. Cl. .......................... 455/554; 455/553; 455/555; 455/556
[58] Field of Search .................... 455/553, 554, 455/555, 556

[56] References Cited

U.S. PATENT DOCUMENTS

| | | | |
|---|---|---|---|
| Re. 35,050 | 10/1995 | Gibbs et al. | 455/553 |
| 4,658,096 | 4/1987 | West, Jr. et al. | 379/59 |
| 5,355,402 | 10/1994 | Weis et al. | 455/553 |
| 5,390,233 | 2/1995 | Jensen et al. | 455/553 |
| 5,392,282 | 2/1995 | Kiema | 370/77 |
| 5,440,613 | 8/1995 | Fuentes | 379/60 |
| 5,459,780 | 10/1995 | Sand | 379/265 |
| 5,463,623 | 10/1995 | Grimes et al. | 370/79 |
| 5,479,479 | 12/1995 | Braitberg et al. | 455/33.1 |
| 5,490,235 | 2/1996 | Von Holten et al. | 455/553 |
| 5,495,484 | 2/1996 | Self et al. | 379/84 |
| 5,555,258 | 9/1996 | Snelling et al. | 455/553 |
| 5,579,472 | 11/1996 | Keyworth et al. | 455/553 |
| 5,594,782 | 1/1997 | Zicker et al. | 455/554 |
| 5,612,990 | 3/1997 | Meier et al. | 455/553 |
| 5,629,976 | 5/1997 | Loke et al. | 455/553 |
| 5,640,444 | 6/1997 | O'Sullivan | 455/554 |
| 5,655,003 | 8/1997 | Erving et al. | 455/434 |
| 5,710,986 | 1/1998 | Obayashi et al. | 455/553 |
| 5,732,355 | 3/1998 | Lipp et al. | 455/446 |
| 5,751,789 | 5/1998 | Farris | 455/554 |
| 5,781,612 | 7/1998 | Choi et al. | 455/553 |
| 5,790,957 | 8/1998 | Heidari | 455/553 |

*Primary Examiner*—David R. Hudspeth
*Assistant Examiner*—Daniel Abebe

[57] ABSTRACT

A system and method for supporting digital communications for a single-premises wireline digital telephone include converting between a first signaling format that is compatible with conventional bidirectional wireline telecommunications and a second signaling format that is compatible with bidirectional wireless telecommunications. In the preferred embodiment, the single-premises telephone is a feature phone having a visual readout or light display that is activated upon receiving party-specific call messages. A connection from the digital telephone to an interface may include protocol conversion and/or digital-to-analog conversion that utilizes the first signaling format. On the other hand, signal transfers between the interface and the transceiver utilize the second signaling format. In one embodiment, the single-premises digital telephone is remotely located from a switching network, such as a private branch exchange, so that the switching network supports the call features of the feature phone. In another embodiment, the single-premises digital phone is on the premises of the switching network, allowing alternative connectivity schemes for a call.

17 Claims, 3 Drawing Sheets

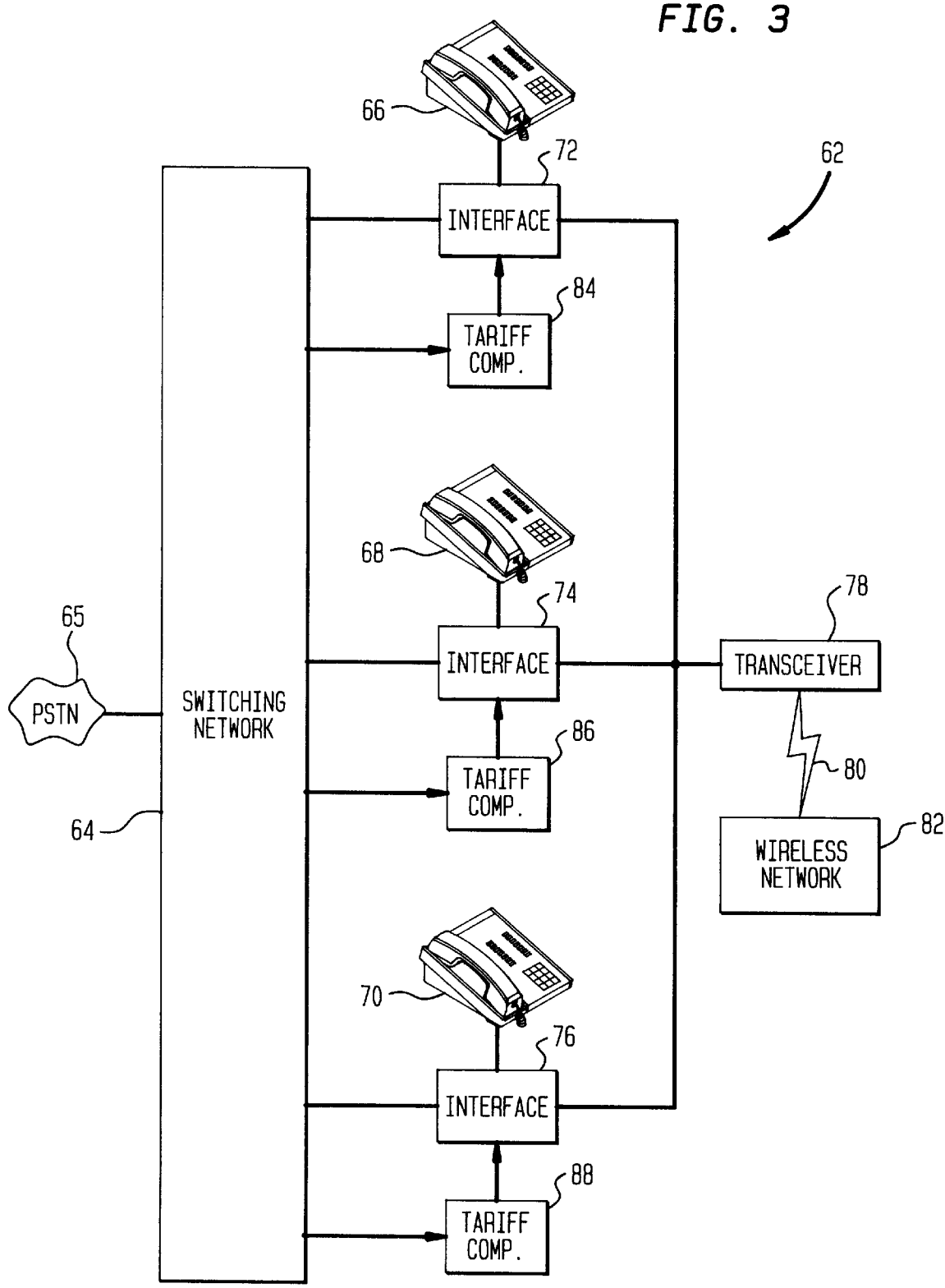

SYSTEM AND METHOD FOR PROVIDING WIRELESS CONNECTIONS FOR SINGLE-PREMISES DIGITAL TELEPHONES

BACKGROUND OF THE INVENTION

The invention relates generally to systems and methods for supporting digital telecommunications and more particularly to wireless transmissions from a single-premises digital telephone.

DESCRIPTION OF THE RELATED ART

Many medium to large-sized businesses utilize a private branch exchange (PBX) to support telephone service. The PBX is a multi-line switching network that is typically located on the premises of the business. The switching network establishes connections between two PBX-supported telephones or between a PBX-supported telephone and an off-premises telephone. A telephone station may include a computer and/or video equipment, so that user data and video information may be transmitted with the voice information.

Within the telecommunications industry, digital transmissions offer advantages over transfers of analog signals. Digitizing the information reduces the data to a pattern of discrete values, e.g., ones and zeros. Noise that is inadvertently added to the signal may be more easily removed than noise within an analog signal. For a telecommunications connection made over a long distance, signals within the digital domain can be repeatedly received, processed to remove noise, and then retransmitted. Such a cascaded arrangement significantly reduces the possibility that signal noise will reach a detectable level.

Typically, telecommunications within the digital domain utilize more than one channel. For example, a proprietary digital protocol of Siemens Rolm Communications Inc. employs two user channels (64 kbps voice and 64 kbps data) and one signaling channel (64 kbps digital signaling). The resulting bandwidth allows digital telephones to provide display capabilities and other advanced features that are not available when using a conventional telephone. As one example, information regarding an incoming call may be displayed on a readout of the digital telephone. The displayed information may include calling party identification, such as the trunk number or the trunk group number of the calling party, or even the name of the party. Moreover, if the incoming call has been forwarded, the displayed information may include the originally called number and the reason for forwarding, e.g., forwarded from a ring-busy telephone or a ring-no-answer telephone. The digital telephone may also include features such as a light emitting diode (LED) display or other light display that alerts a user that a message has been stored for the user within a voice messaging system. Digital telephones of this type are often referred to as "feature phones." The "party-specific call messages" of a feature digital phone are distinguishable from "call-handling call messages." The party-specific call messages are intended to provide information to one or both of the parties of a call session. The information may be conveyed by means of a visual display or by audio alert. The party-specific call messages are often unique to the call session. On the other hand, the call-handling call messages are often transparent to the parties and relate directly to telephony signal exchanges. Examples of call-handling call messages include CONNECT, CONNECT ACKNOWLEDGE, DISCONNECT, and RELEASE signals.

The party-specific call messages are also distinguishable from the transmission of user data over telephone lines. One or both of the parties of a call session may initiate the transmission of user data during the session. For example, an agent of an automatic call distribution (ACD) service for processing sales to calling customers may send and receive product and order information during the course of a call. The user data are unrelated to telephone service.

Persons located off-premises of the PBX or a similar digital call processing system may desire to have access to the advantages of digital communication. Such access would allow a telecommuter to establish a "dual presence" (office and home) in which calls from the home of the telecommuter would appear to be made from an on-premises office. Optionally, a digital wireline link may be formed between the PBX and the off-premises phone. For example, an integrated services digital network (ISDN) link having a pair of B-channels for carrying user data and/or digitized voice information and having a D-channel for carrying digitized call messages may be employed to allow a remote user to take advantage of digital phone features.

There are a number of concerns with providing a multi-channel digital link between a PBX and an off-premises feature phone. One concern relates to availability. Such digital links are not universally available. Moreover, even if a remote user has access to such a link, the protocol of the link and the protocol of the PBX or digital phone may not be compatible. Another concern is that multi-channel digital links are significantly more expensive than most alternative links.

Within certain circumstances, it may be advantageous to route a call from an on-premises digital phone having wireline multi-channel capability using connectivity unrelated to the wireline multi-channel capability. If the call resources of the PBX are presently exhausted so that a blockage condition has been established, or if certain resources are functioning improperly, other available connectivity approaches would be beneficial. Moreover, where alternative routing approaches are available, operations of telecommunications equipment potentially is executed more cost efficiently.

What is needed is a system and method for supporting digital communications and for permitting a wireline digital telephone that is located at a fixed premises to access remote digital telephones without the conventional connectivity for the wireline telephone.

SUMMARY OF THE INVENTION

A system for supporting digital communications for a single-premises wireline digital telephone includes converting between a first signaling format compatible with conventional bidirectional wireline telecommunications and a second signaling format that is compatible with bidirectional wireless telecommunications. In one embodiment, switching from the first signaling format to the second signaling format includes executing a protocol conversion. Signal transfers with the wireline digital telephone utilize the first signaling format. Telecommunications signals within the second signaling format are wirelessly transmitted and received. For incoming signals, a transceiver receives voice information and call messages within the second signaling format. The incoming voice and call message data are converted to digitized information compatible with the first signaling format. In the preferred embodiment, the single-premises digital telephone is a feature phone, so that the call messages include both the conventional call-handling messages and party-specific messages, such as the party-specific messages for activating a light display or a visual readout.

The single-premises digital telephone of the system is typically remotely located from a switching network, such as a private branch exchange (PBX) that supports digital communication processing for a network of on-premises digital phones. However, in one embodiment, the single-premises digital phone is on the premises of a system that has both wireline and wireless capability. In this embodiment, the wireless capability may be used as a connectivity backup or may be used to provide a cost-comparison ability for determining connectivity of a particular call.

BRIEF DESCRIPTION OF THE DRAWINGS

FIG. 3 is a schematical diagram of a second embodiment of the invention using alternative wireline and wireless connectivity schemes.

DETAILED DESCRIPTION

Figure 1:
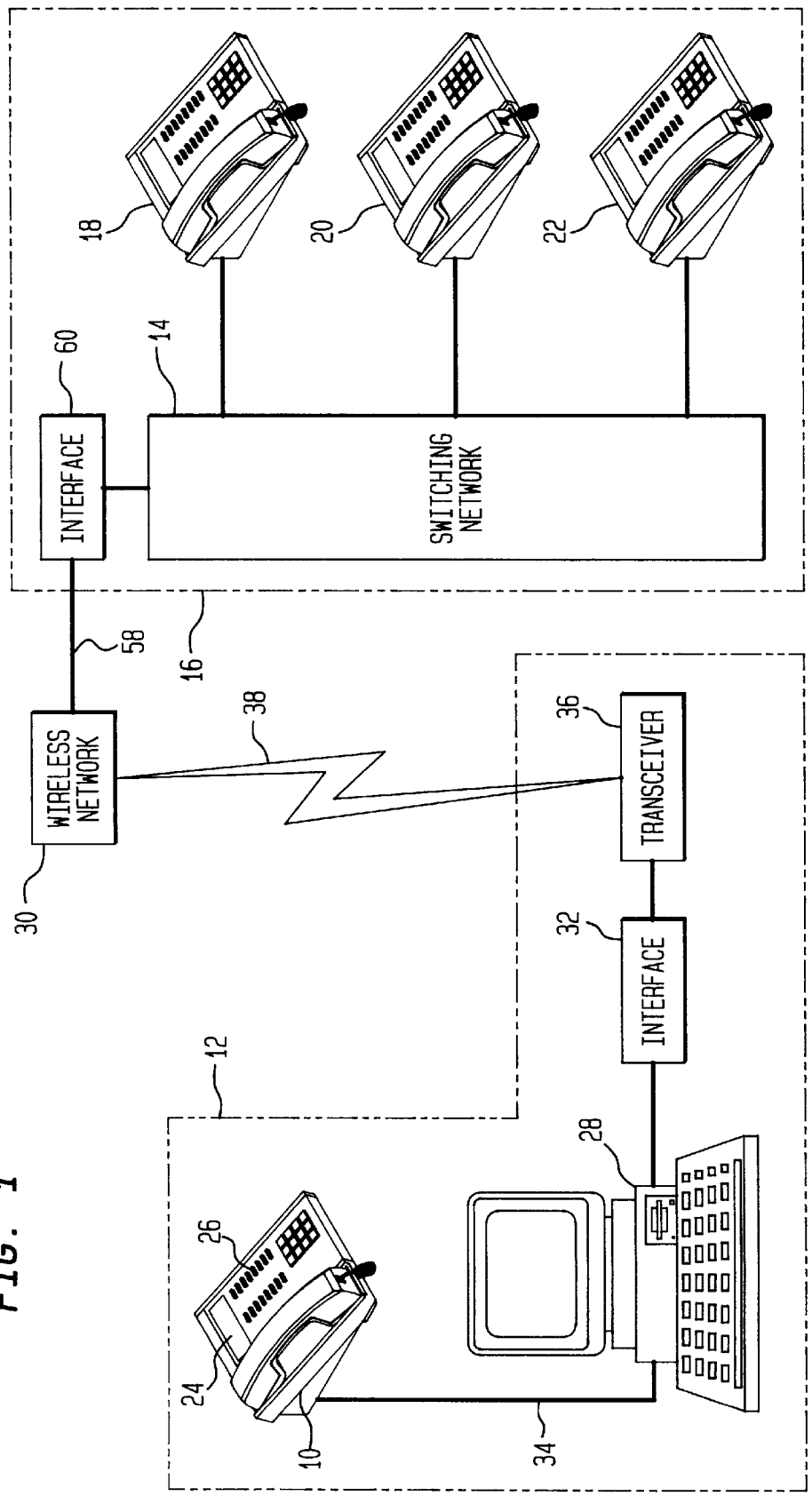
FIG. 1 is a schematical diagram of one embodiment of a system for enabling wireless communication between a single-premises digital telephone and a remote private branch exchange in accordance with one embodiment of the invention.

FIG. 1 illustrates one embodiment of a system for supporting wireless communication using a single-premises digital telephone 10. In this embodiment, the single-premises telephone is at a site 12 that is remotely located from a switching network 14, and the digital telephone is specifically designed to be supported by the switching network. For example, the switching network 14 may be call routing equipment of a private branch exchange (PBX) 16 and the remote site 12 may be the home premises or a small business site of a user.

A "single-premises digital telephone" is defined herein as a digital telephone that is adapted for wireline communications with digital telephones at other premises. Thus, the remote digital telephone 10 of the embodiment of FIG. 1 is preferably functionally identical to any one of the PBX-supported digital telephones 18, 20 and 22 on the premises of the switching network 14. If the PBX 16 utilizes a specific protocol, such as the protocol scheme developed by Siemens Rolm Communications Inc., the remote digital telephone 10 preferably is of the type that is compatible with the PBX protocol. This facilitates communication between the PBX and the remote telephone beyond the mere exchange of voice information and conventional call-handling messages.

The remote digital telephone 10 and the on-premises digital telephones 18, 20 and 22 are feature phones. Thus, party-specific call messages are exchanged in addition to call-handling messages and voice information. Examples of call-handling messages include CONNECT, CONNECT ACKNOWLEDGE, DISCONNECT, and RELEASE call messages. On the other hand, the party-specific call messages are often unique to the call session and are made apparent to at least one user of the digital telephone. Examples of party-specific call messages include an identifier of a calling party or a trunk number of the calling party. If an incoming call has been forwarded to the remote feature phone 10 from one of the on-premises feature phones 18, 20 and 22, the party-specific call message may be the indication of the originally called number and the reason that the call has been forwarded, e.g., forwarding from a ring-busy telephone or a ring-no-answer telephone. The party-specific call messages may be presented to a user by means of a readout display 24 or one or more light indicators 26, or both. While the readout display and the light indicators are shown as being contained on the feature phone, this is not critical. Alternatively, the party-specific call messages may be displayed on a monitor of a personal computer 28. The personal computer may be employed by the user to transmit and receive data via a wireless network 30, as will be explained more fully below.

The remote feature phone 10 is connected to an interface 32 by a digital link 34, either directly or through the personal computer 28. In its least complex embodiment, the interface 32 has a first component that is the functional equivalent of conventional interfaces at the PBX-supported phones 18, 20 and 22, and further includes a second component that is an interface to a transceiver 36 for sending and receiving wireless transmissions via the wireless network 30. Thus, the interface 32 provides a conversion between a first signaling format compatible with bidirectional wireline communications and a second signaling format compatible with bidirectional wireless telecommunications.

Signal transmission between the transceiver 36 and the wireless network 30 is preferably within the digital domain, but analog transmissions are also possible. The transceiver 36 may be a wideband digital transceiver that sends and receives signals through a wireless link 38 in an 800 MHz radio frequency (RF) in a wideband digital format. However, in a less preferred embodiment, the link between the transceiver 36 and the wireless network 30 is a radio interface link (RIL) that is established by means of analog techniques. Other formats are also contemplated.

Figure 2:
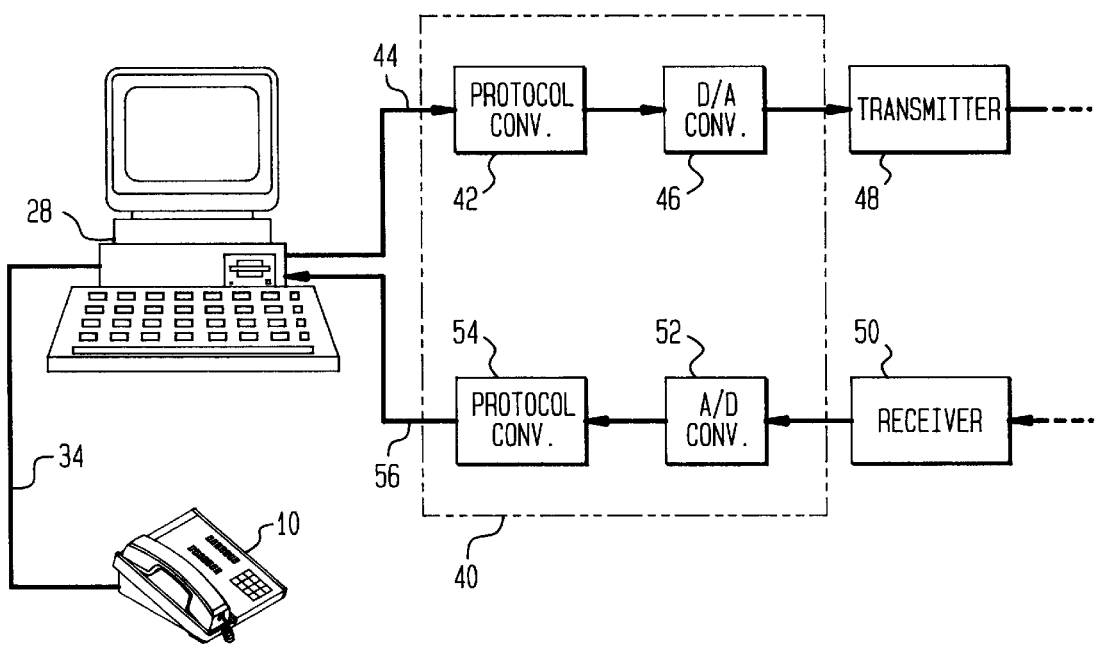
FIG. 2 is a schematical diagram of an exemplary embodiment of an interface of FIG. 1, connected to the single-premises digital telephone.

If the wireless link 38 is within the analog domain, the interface 32 must include converter circuitry. Referring now to FIG. 2, an interface 40 includes a first protocol converter 42 that locally supports the single-premises digital phone 10. Data within the first signaling format are received along a digital input link 44 that carries digitized voice information, call-handling messages and party-specific call messages from the telephone 10 and carries user data from the personal computer 28. The execution of the protocol conversion occurs along parallel data paths for embodiments in which the signals are transmitted within separate channels. For example, there are three distinct conversions if digitized voice information is carried along a first channel, user data is carried along a second channel, and the call message signals occupy a third channel. Each data path is adapted to optimize processing of the type of information, i.e., voice, user data or call message, that is to be processed along that data path. The protocol converted data is input to a digital-to-analog converter 46 that outputs the data in the second signaling format compatible with the wireless transmission. Again, parallel data paths may be established for multi-channel conversions. Signals from the digital-to-analog converter 46 are conducted to the transmitter portion 48 of the transceiver 36 of FIG. 1. The transmitter portion will typically include an antenna, not shown.

A receiver portion 50 of the transceiver 36 is tuned to receive signals from the wireless network 30. The signals are input to an analog-to-digital converter 52 that presents signals in the digital domain to a second protocol converter 54. Parallel data paths are typically utilized for multi-channel embodiments. Consequently, signals in the second signaling format from the receiver 50 are output in the first signaling format along a digital output link 56. The data from the digital output link 56 is therefore in a format that is compatible with the personal computer 28 and the single-premises digital phone 10. While not shown in FIG. 2, the interface 40 may include components that maintain a high signal-to-noise ratio. For example, filters may be used to remove harmonics generated by the analog-to-digital converter.

In the embodiment of FIG. 2, the interface 40 converts incoming and outgoing data between the digital domain and the analog domain. As previously noted, the preferred embodiment utilizes digital wireless transmissions. Consequently, the converters 46 and 52 would not be required in the preferred embodiment. Instead, the conversion between the first and second signaling formats may merely be protocol conversion. For example, the first signaling format may be the proprietary protocol of Siemens Rolm Communications Inc., while the second signaling format may be the wireless interface standard used by Motorola Corporation. Other exemplary wireline formats are those compatible with T-1 and ISDN transmissions.

Referring again to FIG. 1, connectivity between the wireless network 30 and the PBX 16 is shown as being a wireline connection 58, but this is not critical. The PBX includes a second interface 60 that will typically be a mirror image of the remotely located interface 32. Consequently, if the wireless link 38 and the wireline connection 58 utilize digital transmission, the interface 60 will not require an analog-to-digital converter. Rather than a wireline connection 58, the wireless network 30 may communicate with the PBX 16 via a second wireless link. This embodiment requires that the PBX 16 include a second transceiver. However, the preferred embodiment provides a wireline connection 58.

In operation, in the embodiment of FIG. 1 the digital feature phone 10 at the remote site 12 may be used by a telecommuting user as a full-featured, off-premises extension from the PBX, despite the absence of digital wireline access to the PBX. The telecommuting user appears to be on-premises and has access to the various features of the feature phone, e.g., message waiting light, screen display, and the like. If the user seeks a dual presence, "autoset-relocate" call forwarding features and/or passwords provide the capability. Voice information is transmitted to the wireless network 30, which may be a cellular service provider. In addition to the conventional call-handling messages, there are party-specific call messages that activate the readout display 24 and/or the light indicators 26 of the feature phone 10. Moreover, there may be user data that are exchanged by means of the personal computer 28. Packetization may be used to transfer the information over a single wireless link 38, or multiple parallel links may be formed. Since call messages are not time-critical, the synchronization of the voice information and the party-specific call messages is not required. In addition to packetizing the information, the transmitted information may be compressed. Compression is particularly important if image information, such facsimile or video data, is transmitted.

Referring now to FIG. 3, the second embodiment of the invention is shown. In this embodiment, a PBX 62 having a switching network 64 that supports a number of digital feature phones 66, 68 and 70 operates in a conventional manner to route calls to and from the feature phones to a public switched telephone network (PSTN) 65. However, in addition to the connection to the switching network 64, each feature phone is connected to a transceiver 78 via an interface 72, 74 and 76. The interfaces function in the same manner as the interfaces described with reference to FIGS. 1 and 2. That is, voice information, call-handling messages and party-specific call messages are exchanged between the feature phones and the interfaces using the first signaling format that is compatible with bidirectional wireline telecommunications, while the same voice information and call messages are exchanged with the transceiver 78 using the second signaling format that is compatible with bidirectional wireless telecommunications. A wireless link 80 is formed between the transceiver and a wireless network 82 to permit the feature phones to communicate with remotely located phones.

The embodiment of FIG. 3 shows a one-to-one correspondence of feature phones 66, 68 and 70 to interfaces 72, 74 and 76. However, the phones may be tied to a single interface that supports all of the phones. This would allow the switching network 64 to exhibit greater control over operation of the interface. As another alternative to the embodiment of FIG. 3, the transceiver 78 may be replaced with three separate transceivers, so that there is a one-to-one correspondence between the feature phones and the transceivers.

The PBX 62 of FIG. 3 permits alternative connectivity schemes. That is, in addition to the wireline connectivity via the PSTN 65, external communication may take place by means of the wireless link 80 to the wireless network 82. As a result, if the switching network 64 or the wireline connections from the switching network to the PSTN are not operating properly, connectivity via the wireless network 82 may be used as a backup. This backup capability is particularly important if the PBX 62 is in a corporate environment that requires telecommunications in order to conduct business.

Operation of the interfaces 72, 74 and 76 for establishing connectivity may also be based upon tariff rates. For example, if the user of feature phone 66 initiates a call to a remote site, a comparison may be made as to whether the wireless rate is less expensive than the wireline rate. For occasions in which wireless connectivity is less expensive than the wireline connectivity, the interface 72 and the transceiver 78 may be activated to complete the connection. FIG. 3 includes three tariff comparing devices 84, 86 and 88, but there will typically be a single device that performs the rate comparison and controls the three interfaces 72, 74 and 76.

Referring now to FIGS. 1–3, the interfaces 32, 40, 72, 74 and 76 are shown as being separate from the digital telephones 10, 66, 68 and 70. However, the interfaces may be internal to the feature phones. Alternatively, the interfaces may be contained in the same housing as the transceivers 36 and 78. In like manner, the tariff comparing devices 84, 86 and 88 of FIG. 3 may be contained within the corresponding feature phone, the corresponding interface or within the switching network 64.

We claim:

1. A system for supporting digital telecommunications comprising:

a single-premises digital telephone of a type compatible with wireline digital telecommunications with other-premises digital telephones, said single-premises digital telephone being at a local site;

converter means connected to said single-premises digital telephone at said local site for converting between a digital wireline signaling format compatible with bidirectional wireline telecommunications and an analog wireless signaling format compatible with bidirectional wireless telecommunications, said converter means being connected to said single-premises digital telephone for signal transfers using said digital wireline signaling format; and transceiver means, connected to said converter means at said local site, for signal exchanges with said converter means using said analog wireless signaling format and for wirelessly transmitting and receiving telecommunications signals using said analog wireless signaling format said single-premises digital telephone being isolated from digital wireline telecommunications outside of said local site such that communication with said single-premises digital telephone from remote sites is limited to wireless communications via said transceiver means.

2. The system of claim 1 wherein said single-premises digital telephone is a feature phone having a visual display that is responsive to party-specific call messages received by said transceiver means.

3. The system of claim 1 wherein said converter means includes a protocol converter.

4. The system of claim 3 wherein said converter means includes a first interface device connected to said single-premises digital telephone and includes a second interface device connected to said transceiver means, said first interface device being compatible with supporting a protocol of a feature phone, said second interface device being compatible with supporting a protocol of cellular network transmission.

5. The system of claim 4 wherein said first and second interface devices are digital devices.

6. The system of claim 3 wherein said converter means further includes an analog-to-digital converter.

7. The system of claim 1 wherein said converter means and said transceiver means connect said single-premises digital telephone to a private branch exchange (PBX), said single-premises digital telephone being supported by said PBX at a site remote from said PBX.

8. A method of enabling incoming and outgoing call capability for an off-premises digital feature phone via a private branch exchange (PBX) comprising steps of:

providing protocol support for said off-premises digital feature phone at a site remote from said PBX, said feature phone being specific to wireline digital telecommunications;

for calls to be connected via said PBX, utilizing bidirectional wireless communication to establish a connection between said feature phone and said PBX, including exchanging party-specific and call-handling call messages via a wireless medium; and executing visual indications of party-specific call messages that are received at said feature phone from said PBX via said wireless medium.

9. The method of claim 8 wherein said step of executing visual indications includes activating at least one of a light display and a visual readout.

10. The method of claim 8 wherein said step of utilizing bidirectional wireless communication includes utilizing an analog cellular network and converting voice and call messages from a format compatible with said feature phone to a format compatible with said bidirectional wireless analog communication.

11. The method of claim 10 wherein said step of converting to said format compatible with said bidirectional wireless communication is a step that includes transmitting and receiving digital signals.

12. A system for supporting a digital feature phone of a PBX comprising:

a plurality of digital telephones compatible with digital wireline telecommunications;

switching circuitry located on-premises with said digital telephones for supporting said digital telephones for off-premises calling via wireline connections;

wireline connections from said switching circuitry to a public switched telephone network;

wireless transmission means for connecting said digital telephones to a wireless service provider; and means for switching between utilizing said wireline connections and said wireless transmission means to conduct a call from one of said digital telephones based upon at least one of costs of conducting said call via said wireline connections and said wireless transmission means and availability of said wireline connections and said wireless transmission means to conduct said call.

13. The system of claim 12 wherein said means for switching is responsive to a tariff comparison means for comparing a cost of conducting said call via said wireline connections with a cost of conducting said call via said wireless service provider.

14. The system of claim 13 further comprising a plurality of said means for switching, with a one-to-one correspondence of digital telephones and said means for selecting.

15. The system of claim 12 wherein said means for switching is responsive to detection of a blockage condition of said wireline connections, by at least one of system resource failure and exhaustion of system resources.

16. The system of claim 12 wherein each of said digital telephones is a feature phone having a digital display.

17. A system for supporting digital telecommunications comprising:

a private branch exchange (PBX) at a local site;

a single-premises digital telephone of a type compatible with wireline telecommunications with other-premises digital telephones, said single-premises telephone being on-site with said PBX and being supported by said PBX for said wireline telecommunications;

converter means connected to said single-premises digital telephone at said local site for converting between a digital wireline signaling format compatible with bidirectional wireline telecommunications and a wireless signaling format compatible with bidirectional wireless telecommunications, said converter means being connected to said single-premises digital telephone for signal transfers using said digital wireline signaling format;

transceiver means, connected to said converter means at said local site, for signal exchanges with said converter means using said wireless signaling format and for wirelessly transmitting and receiving telecommunications signals using said wireless signaling format;

switching means for selecting between a wireline operations mode of enabling said wireline telecommunications and a wireless operations mode of enabling said wireless transmission and reception of telecommunications signals; and tariff calculation means for comparing tariff rates for calls made within said wireline operations mode and said wireless operations mode, said switching means being responsive to said tariff calculation means as a basis for said selecting.

\* \* \* \* \*